United States Patent [19]
Milliman

[11] Patent Number: 5,674,318
[45] Date of Patent: Oct. 7, 1997

[54] CROSS-HEAD DIE APPARATUS

[76] Inventor: James A. Milliman, 8644 Emerald Cir. S., Rome, N.Y. 13440

[21] Appl. No.: 320,329

[22] Filed: Oct. 11, 1994

[51] Int. Cl.$^6$ .............................. B05C 3/02; B05C 3/12; B05C 17/00; B05C 19/00

[52] U.S. Cl. .................. 118/405; 118/410; 118/420; 118/DIG. 18; 118/DIG. 19; 425/113

[58] Field of Search .................. 118/405, 410, 118/420, DIG. 18, DIG. 19; 425/113

[56] References Cited

U.S. PATENT DOCUMENTS

| | | | |
|---|---|---|---|
| 3,947,173 | 3/1976 | Dougherty | 325/113 |
| 4,774,906 | 10/1988 | Lu | 118/404 |
| 5,215,698 | 6/1993 | Altimus | 264/167 |
| 5,348,586 | 9/1994 | Temple, Jr. et al. | 118/405 |

*Primary Examiner*—Donald E. Czaja
*Assistant Examiner*—Jacqueline A. Ruller
*Attorney, Agent, or Firm*—Charles S. McGuire

[57] ABSTRACT

A cross-head die for applying one or more layers of coating materials to a single, longitudinally fed, filamentary member, or to a plurality of such members in spaced, side-by-side relation. Tip and die members of relatively flat, wafer-like configuration are placed in a cylindrical cavity of the body member of the apparatus with central openings in each of the tip and die members coaxially arranged and a protrusion surrounding the opening in the tip extending into the opening in the die. Flowable coating material is injected through a radial opening in the body member and flows in both directions about an annular passageway formed by cooperatively arranged grooves in the peripheries of the tip and die members. The coating material flows from the annular passageway to the die aperture through opposing, spaced, angularly arranged surfaces on the tip and die members. In an embodiment for applying two layers of coating material, two tip members and a single die member, all of wafer-like configuration are employed, and in an embodiment for coating multiple members the apertures in the tip and die are of oblong configuration.

31 Claims, 10 Drawing Sheets

CROSS-HEAD DIE APPARATUS

BACKGROUND OF THE INVENTION

The present invention relates to the class of extruding apparatus commonly known as cross-head dies. One or more electrical wires or other elongated, filamentary members are moved axially through such apparatus as a flowable coating material is injected therein, and the coating material is applied in one or more substantially concentric layers to the filamentary member(s) as it exits the apparatus. This is the conventional manner of applying, for example, a plastic insulating layer to an electrical wire.

Prior art cross-head die apparatus is typified by that disclosed in the present inventor's U.S. Pat. Nos. 5,031,568 and 5,316,583, and references cited therein. In such apparatus, a plurality of elements are cooperatively positioned within an axial bore of the body, and molten plastic is introduced through a radial bore. The elements are maintained in the desired relationship by mating, conically tapered surfaces. In the apparatus of the aforementioned Pat. No. 5,031,568, in addition to the body and threaded cover, there are four internal elements, namely a tip holder, a die tip, a die and a die holder. In the apparatus of Pat. No. 5,316,583, only three internal elements are required, a tip holder, die tip and die. In each case, the disclosed apparatus applies a single layer of coating material to the wire.

As a general rule, it is desirable to minimize the number of elements in a cross-head die, as with other structural assemblies, since the parts reduction normally results in cost savings. Also, assembly and disassembly time, frequency of breakdowns and parts replacement, etc. likewise may be expected to benefit from reduction of the number of parts. This assumes, of course, that the speed of operation, quality of final product, and the like, are not compromised by elimination of certain parts. In particular, in operation of a cross-head die, it is essential to distribute the molten coating material evenly about the axially moving filamentary member.

Accordingly, it is a principal object of the present invention to provide a cross-head die assembly for applying a layer of coating material to a filamentary member moved axially through the die wherein the number of parts in the assembly is less than in prior art assemblies of the same class of apparatus.

Another object is to provide a cross-head die of simplified design and generally lower cost than prior art apparatus of the same type.

A further object is to provide novel and improved tip and die elements for use in cross-head dies.

Still another object is to provide cross-head die apparatus including means for easily removing internal elements from an axial bore in the die body.

Other objects will in part be obvious and will in part appear hereinafter.

SUMMARY OF THE INVENTION

The cross-head die of the present invention includes the usual body member having a through axial bore for passage of a filamentary member to be coated and a radial bore through which molten plastic or other flowable coating material is supplied to the axial bore for application to the filamentary member. In an embodiment for applying a single layer of coating material to the filamentary member, a tip member and a die member are positioned within the axial bore of the body. Each of the tip member and die member has a circular periphery for mating with the axial bore of the body, and is of relatively flat, wafer-like configuration. The tip and die members each have central openings, that of the tip member surrounded by a protrusion which extends into and through the central opening in the die member. The member to be coated has a diameter closely approximating that of the opening in the tip member which thus serves to maintain axial alignment of the filamentary member as it passes through the apparatus.

The tip and die members are positioned in coaxial relation with one another and with the axial bore of the body, wherein they are retained by a threaded cover member. Pins extend from a flat surface of the tip member into openings in the opposing surface of the die member to maintain a desired rotational orientation of the members relative to one another. A separate pin extends either radially or axially into the body to engage a notch or opening in one or both members to maintain a desired rotational orientation of the members relative to the axial bore in the body.

Peripheral grooves in the opposing surfaces of the tip and die members combine to form a unitary groove of semicircular cross section which, together with an adjacent portion of the surface of the axial bore in the body forms an enclosed passageway extending partially around the tip and die members. The center of this passageway is adjacent the inner end of the radial bore in the body, whereby the coating material enters the passageway and flows in both directions around the periphery of the tip and die members. On diametrically opposite sides, the passageway merges with surface portions of the tip and die members which taper inwardly from the peripheral edges to the central protrusion. Coating material flows from opposite sides of the peripheral passageway, over these tapered surfaces and through an annular space between the tip member protrusion and the opening in the die member where it is deposited on the filamentary member moving axially through the apparatus.

In a second embodiment, the cross-head die is adapted to apply two layers of coating material, one layer covering the other, to the filamentary member. Two radial bores in the body communicate with the axial bore on diametrically opposite sides and are axially spaced along its length. Three members, termed a first and a second tip member and a die member, of the same general wafer-like configuration as the tip and die member of the first embodiment, are positioned coaxially within the axial bore and retained by a threaded cover member. The first tip member and the die member are positioned on opposite sides of the second tip member with flat, parallel, opposite surface portions of the second tip member contacting like surface portions of the first tip member and the die member. Locator pins maintain the desired rotational orientation of the members relative to one another and to the axial bore of the body, as in the first embodiment.

The first and second tip members have peripheral grooves in their opposing surfaces forming a first, unitary groove of semicircular cross section which, together with portions of the body axial bore form a first, enclosed passageway extending around first portions of the peripheries of the first and second tip members. The opposing surfaces of the second tip member and the die member also have adjacent peripheral grooves forming a second, unitary groove which, together with portions of the body axial bore form a second, enclosed passageway extending around second portions of the peripheries of the second tip member and the die member.

Opposing surface portions on opposite sides of the first and second tip member communicate with opposite ends of the first passageway and taper inwardly from the periphery toward the center of the members. The center of the first passageway is adjacent the inner end of one of the radial bores in the body. A first coating material flows through this radial bore, in both directions around the first passageway, and through the spaces between the opposed, tapered surfaces on each side of the two tip members.

Opposing surface portions of the second tip member and the die member taper inwardly from the periphery toward the center on each side. The second passageway communicates at opposite ends with the spaces between the tapered surfaces. A second coating material flowing through the other radial bore in the body enters the second passageway at its center and flows in both directions around the second tip member and the die member, into the spaces between their opposing, tapered surfaces. Both the first and second tip members have axially extending protrusions surrounding central openings and the die member has a central opening into which these protrusions extend.

The first coating material flows from the spaces between the opposing, tapered surfaces of the first and second tip members through an annular space between the outer surface of the protrusion on the first tip member the opening in the second tip member to be deposited in covering relation to a filamentary member traveling axially through the die body. The second coating material flows from the spaces between the opposed, tapered surfaces of the second tip member and the die member through an annular space between the outer surface of the protrusion on the second tip member and the opening in the die member to be deposited in covering relation to the layer of first covering material. Thus, the filamentary member is coated with two concentric layers of coating materials.

A further disclosed embodiment illustrates how principles of the invention may be utilized in the application of continuous coatings to a plurality of spaced, parallel filamentary members, as in so-called flat ribbon cables. In all embodiments, the tip and die members may be easily removed from the axial bore of the body by removing the cover and advancing a threaded member into the opposite end of the bore.

The foregoing and other features of the structure and operation of the cross-head die apparatus of the invention will be more readily understood and fully appreciated from the following detailed description, taken in conjunction with the accompanying drawings.

DETAILED DESCRIPTION

The invention is illustrated, and will be described, in three constructions or embodiments, one for applying a single coating layer to a single filamentary member, one of applying a plurality of coating layers to a single filamentary member, and one for applying a single coating layer to a plurality of filamentary members. Throughout the balance of the specification, the filamentary member will be referred to for convenience as a wire, although it will be understood that the cross-head die of the invention may by utilized to apply coatings not only to electrical conductors but also to optical fibers and other elongated, filamentary members which are moved axially through the apparatus.

Figure 1:
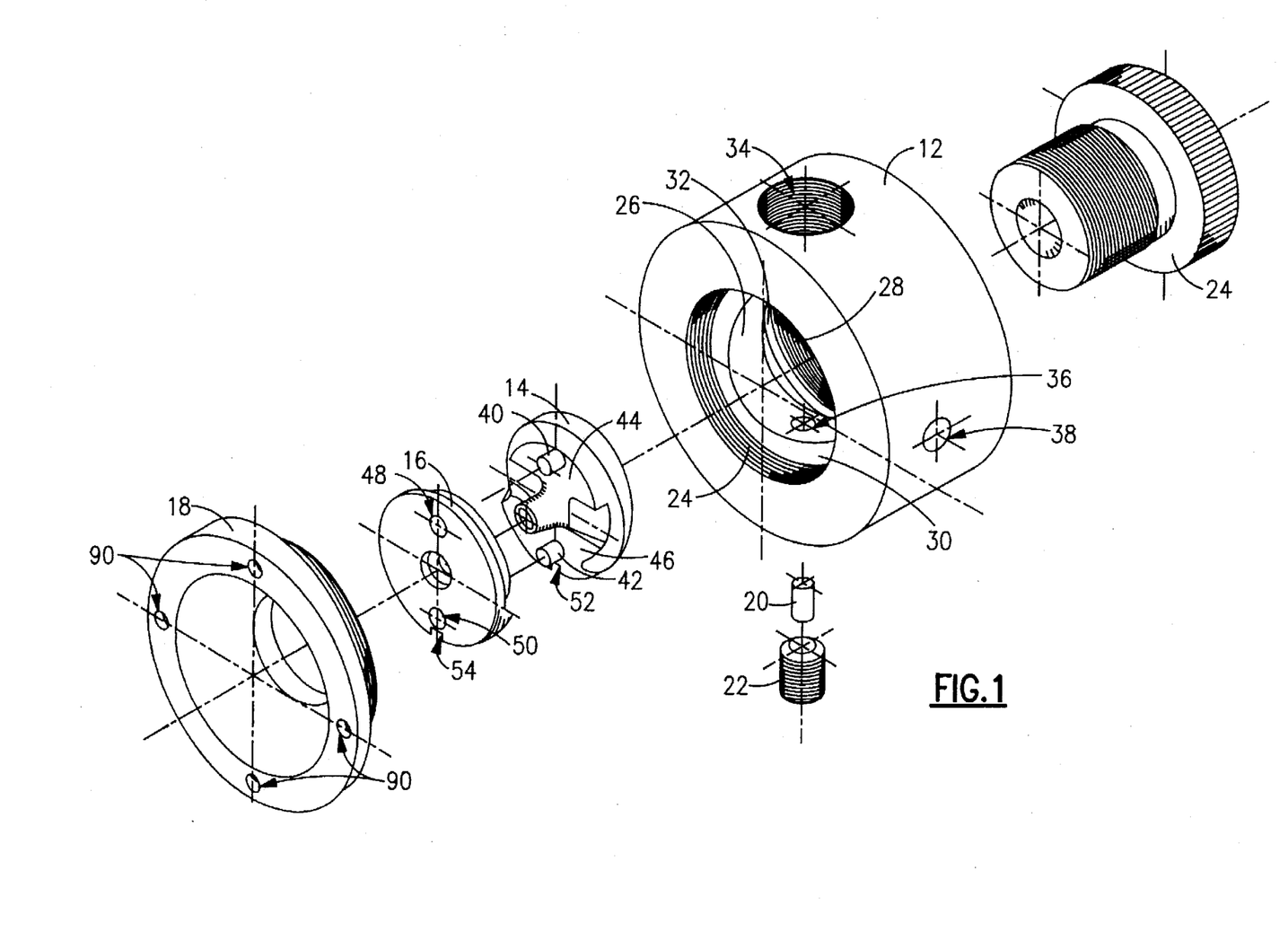
FIG. 1 is an exploded, perspective view of a first disclosed embodiment of the cross-head die of the invention.
Figure 2:
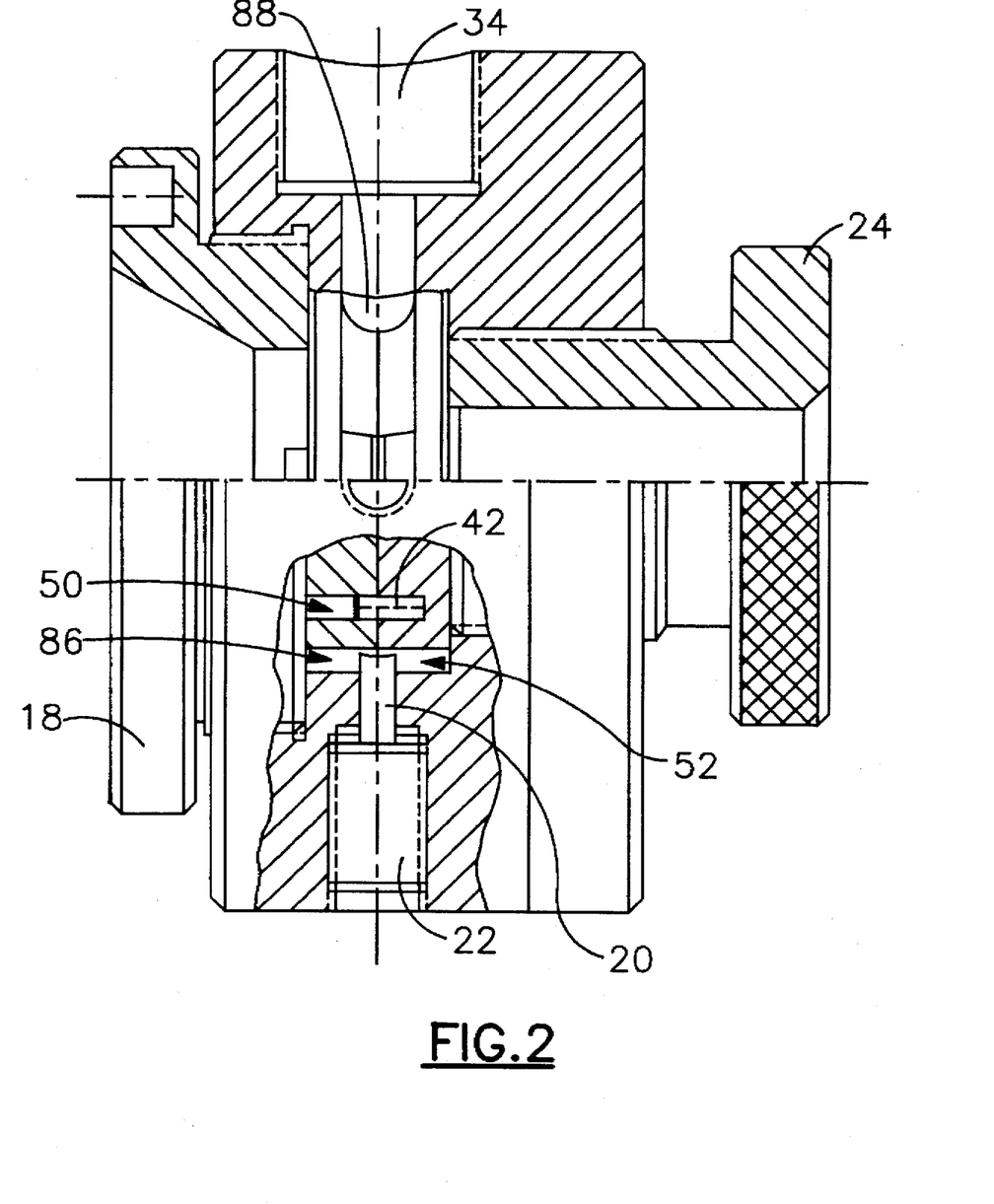
FIG. 2 is a side elevational view of the die of FIG. 1, showing the elements in assembled relation, the upper half and a fragment of the lower half being in section through the vertical centerline.

Referring now to the drawings, in FIGS. 1 and 2 are seen the elements of a first embodiment of a cross-head die apparatus, denoted generally by reference numeral 10, incorporating features of the present invention. Apparatus 10 comprises body portion 12, tip member 14, die member 16 and cover portion 18. Also shown in FIGS. 1 and 2 are locator pin 20, its retaining screw 22, and threaded element 24, the functions and operations of which will be described later.

An axial bore extending through body portion 12 includes forward, threaded portion 24, intermediate, smooth portion 26 and rear, threaded portion 28, of successively smaller diameter. Portions 24 and 26 are separated by radially extending surface portion or shoulder 30, and portions 26 and 28 are separated by shoulder 32. Radial bore 34 communicates with portion 26 of the axial bore and is threaded for connection thereto of the end of a pipe or conduit (not shown) of the type conventionally used to supply molten plastic or other flowable coating material to cross-head dies. Radial bore 36 also communicates with the axial bore on the side diametrically opposite radial bore 34. As seen in FIG. 2, radial bore 36 includes an inner portion through which pin 20 extends, and an outer, threaded portion wherein retainer screw 22 is threadedly inserted. Radial bore 38 and a like radial bore on the opposite side of body portion 12 are provided for connection of the apparatus to support means in conventional fashion.

Tip member 14 and die member 16 are of circular, relatively flat form, having what is termed a wafer-like configuration since their thickness is a fraction (e.g., 3/16) of their diameters. In the assembled condition, as seen in FIG. 2, tip and die members 16 and 14 have equal diameters approximately equal to the diameter of axial bore portion 26 and a combined thickness approximately equal to the axial length of bore portion 26. Tip and die members 14 and 16 are positioned within axial bore portion 26 and are maintained in a desired rotational orientation relative to one another by pins 40 and 42 extending from surface portions 44 and 46, respectively, of tip member 14 into openings 48 and 50, respectively, of die member 16. Tip and die members 14 and 16 are maintained in a desired rotational orientation with respect to axial bore portion 26 by pin 20 extending into notches 52 and 54 in the peripheries of tip and die members 14 and 16, respectively.

Figure 3:
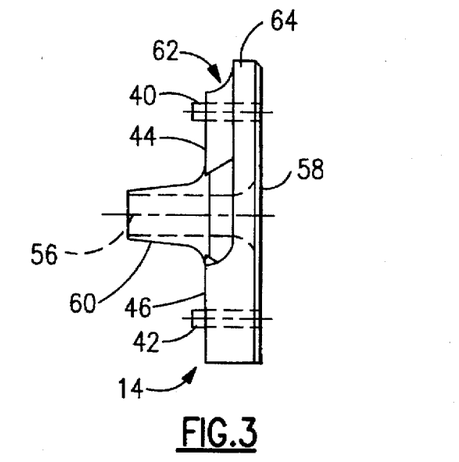
FIG. 3 is a side elevational view of one of the elements of FIGS. 1 and 2.
Figure 4:
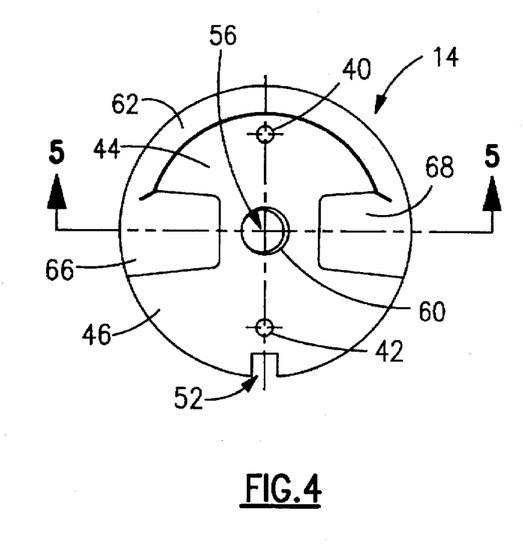
FIG. 4 is a rear elevational view of the element of FIG. 3.
Figure 5:
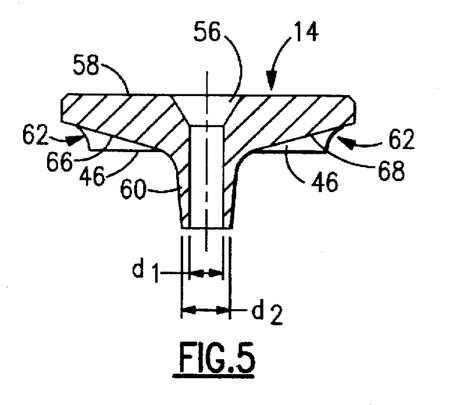
FIG. 5 is a side elevational view in section on the line 5—5 of FIG. 4.

Tip member 14 is shown individually in FIGS. 3–5, wherein the aforementioned features may be more clearly seen. In addition, it will be seen that tip member 14 has a central opening 56 which tapers inwardly from flat, rear surface 58 to a portion of constant diameter $d_1$. The forward portion of opening 56 is surrounded by tip or protrusion 60 which has an outer diameter $d_2$ at its terminal end. A portion of the periphery of tip member 14 is cut away to form groove 62 which, as best seen in FIG. 3, is of arcuate cross section and extends from forward surface portion 44 to cylindrical surface portion 64. Groove 62 extends from a mid-point adjacent pin 40 in both directions about the periphery of tip member 14 to meet surface portions 66 and 68 on opposite sides of opening 58. As best seen in FIG. 5, surface portions 66 and 68 taper in a direction toward the forward side from the outer periphery of the tip member to merge with the base of protrusion 60.

Figure 6:
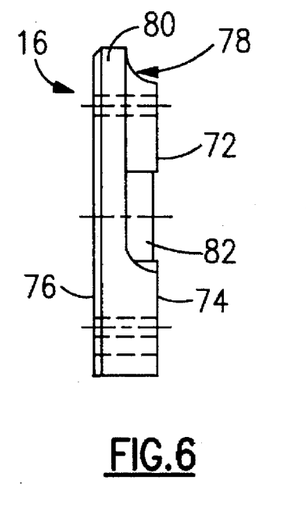
FIG. 6 is a side elevational view of another of the elements of FIGS. 1 and 2.
Figure 7:
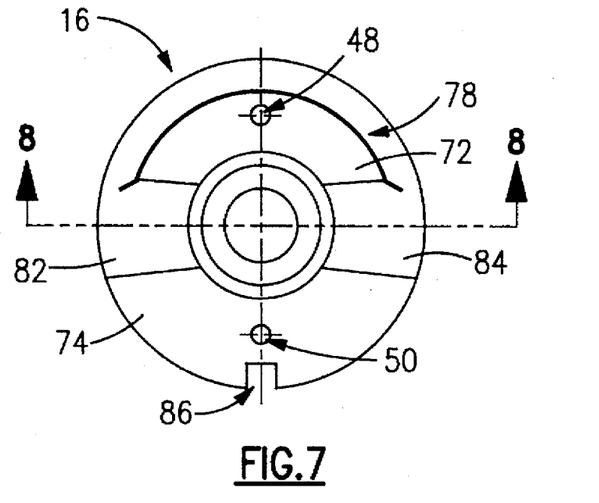
FIG. 7 is a front elevational view of the element of FIG. 6.
Figure 8:
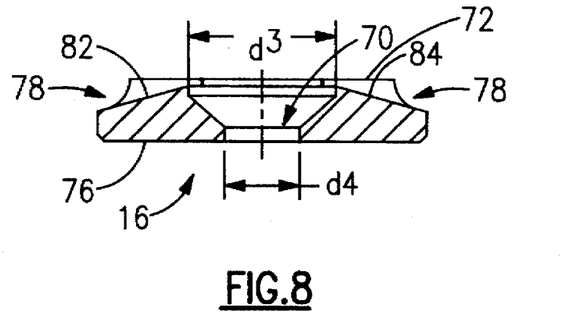
FIG. 8 is a side elevational view in section on the line 8—8 of FIG. 7.

Die member 16 is shown individually in FIGS. 6–8. In addition to the earlier described features, die member 16 is seen to have central opening 70, having a diameter $d_3$ at rear surface portions 72 and 74, and a diameter $d_4$ at front surface 76. Groove 78 extends in an arcuate surface from rear surface portion 72 to cylindrical peripheral surface 80, and from a mid-point adjacent opening 48 in both directions about the periphery of die member 16 to merge with surface portions 82 and 84 on opposite sides of opening 70. Surface portions 82 and 84 taper in a direction toward the rear side from the periphery of the die member toward opening 70. It will be noted that opening 70 has sections of relatively short axial length immediately adjacent both the front and rear surface portions which are of constant diameter and which merge with a central conical or tapered section at opposite ends of the latter. Peripheral notch 86 is diametrically opposite the mid-point of groove 78.

In the assembled condition, forward surface portions 44 and 46 of tip member 14 are in contact with rear surface 76 of die member 16, with pins 40 and 42 extending into openings 48 and 50, respectively. This places notches 52 and 86 adjacent one another so that when the tip and die members are placed within section 26 of the axial bore and rotationally oriented with the peripheral notches adjacent the inner end of radial opening 36, pin 20 extends into the notches, as seen in FIG. 2, and maintains this orientation. When so oriented, grooves 62 and 78 combine to form a unitary groove of essentially semi-circular cross section, denoted in FIGS. 2 and 9 by reference numeral 88, the mid-point of which is adjacent the inner end of radial opening 34. Protrusion 60 extends through opening 70, forming an annular space between the outer surface of the protrusion and the surface of the opening adjacent front surface 76 of die member 16 since diameter $d_4$ is larger than diameter $d_2$.

Figure 9:
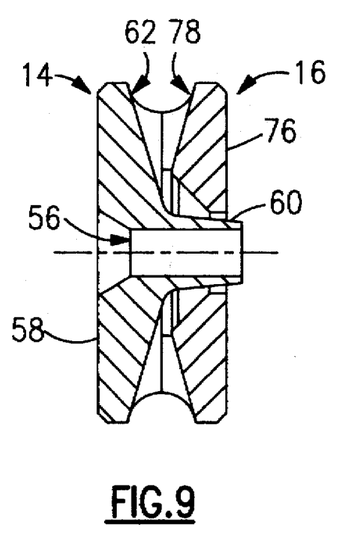
FIG. 9 is a sectional, side elevational view showing in assembled relation the two elements as seen in FIGS. 5 and 8.
Figure 10:
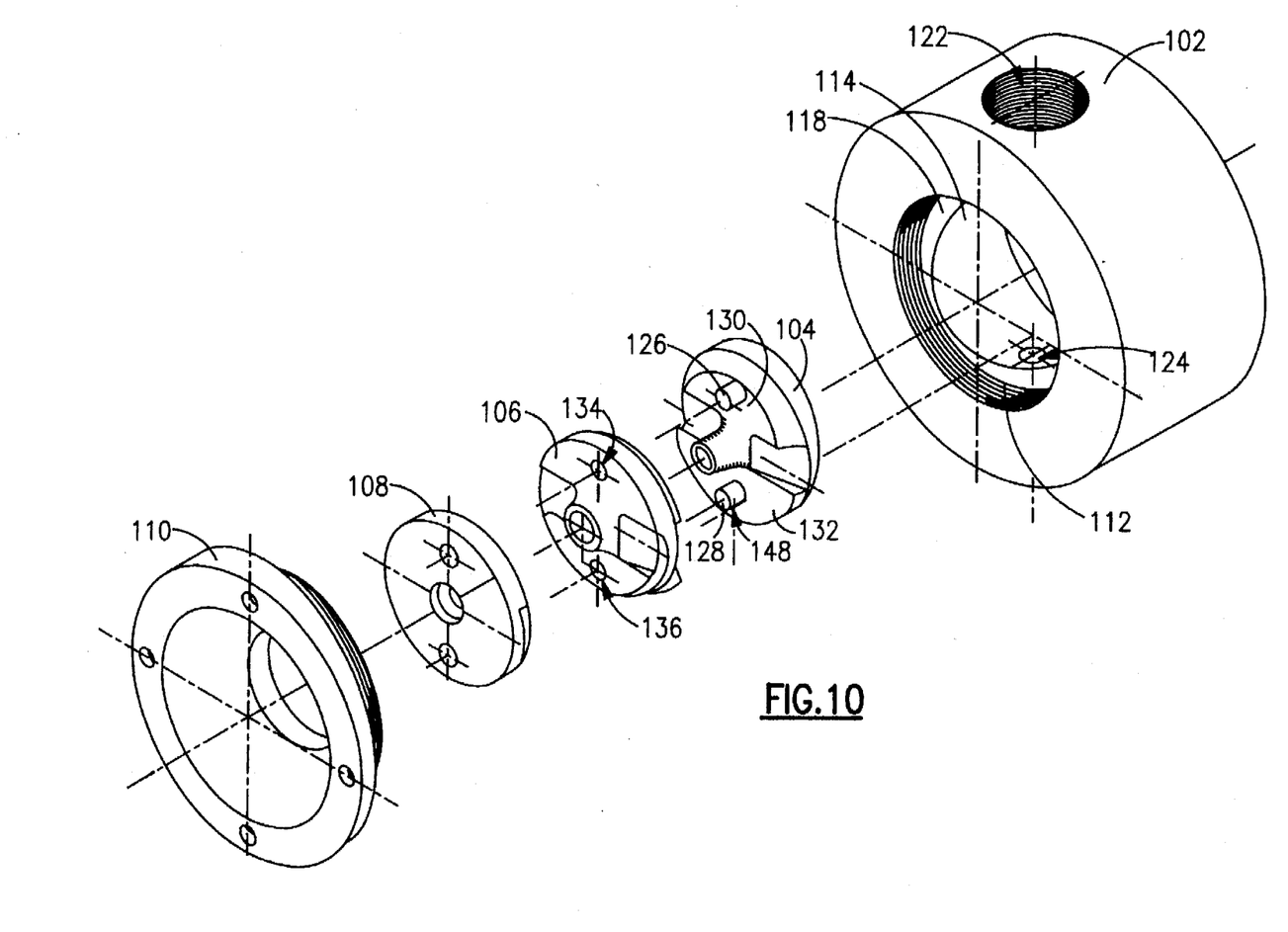
FIG. 10 is an exploded, perspective view of a second embodiment of the invention.

Tapered surface portions 66 and 84 are in spaced, opposed relation, as are surface portions 68 and 82. Unitary groove 88 and the adjacent portion of axial bore section 26 form an enclosed passageway extending from the mid-point of the groove in both directions about the periphery of the tip and die members to the spaces between the opposed, tapered surfaces on both sides. Thus, coating material entering through radial opening 34 (or the conduit connected thereto) flows through the enclosed, peripheral passageway and through the spaces between surface portions 66 and 84 and surface portions 68 and 82 to exit through the annular space between protrusion 60 and opening 70 to be deposited uniformly on the surface of a wire moving axially through opening 56.

The outer portion of rear surface 58 of tip member 14 is maintained in contact with surface 32 within the body portion axial bore by threaded advance of cover portion 18 into contact with surface 30 and thus with the outer portion of front surface 76 of die member 16. Cover portion 18 is advanced into and removed from threaded portion 24 of the axial bore by a spanner wrench engaged with an opposite pair of openings 90 (FIG. 1) of cover portion 18. When it is desired to remove the tip and die members from the axial bore, cover portion 18 is removed and threaded element 24 is advanced into threaded portion 28 to push the tip and die members out of the forward end of the axial bore. Although both cover portion 18 and threaded element 24 are shown engaged in threaded portions 24 and 28, respectively, in FIG. 2, it will be understood that only cover portion 18 will be so positioned during normal operation of the apparatus and element 24 will be advanced into the axial bore only after removal of cover portion 18.

Figure 11:
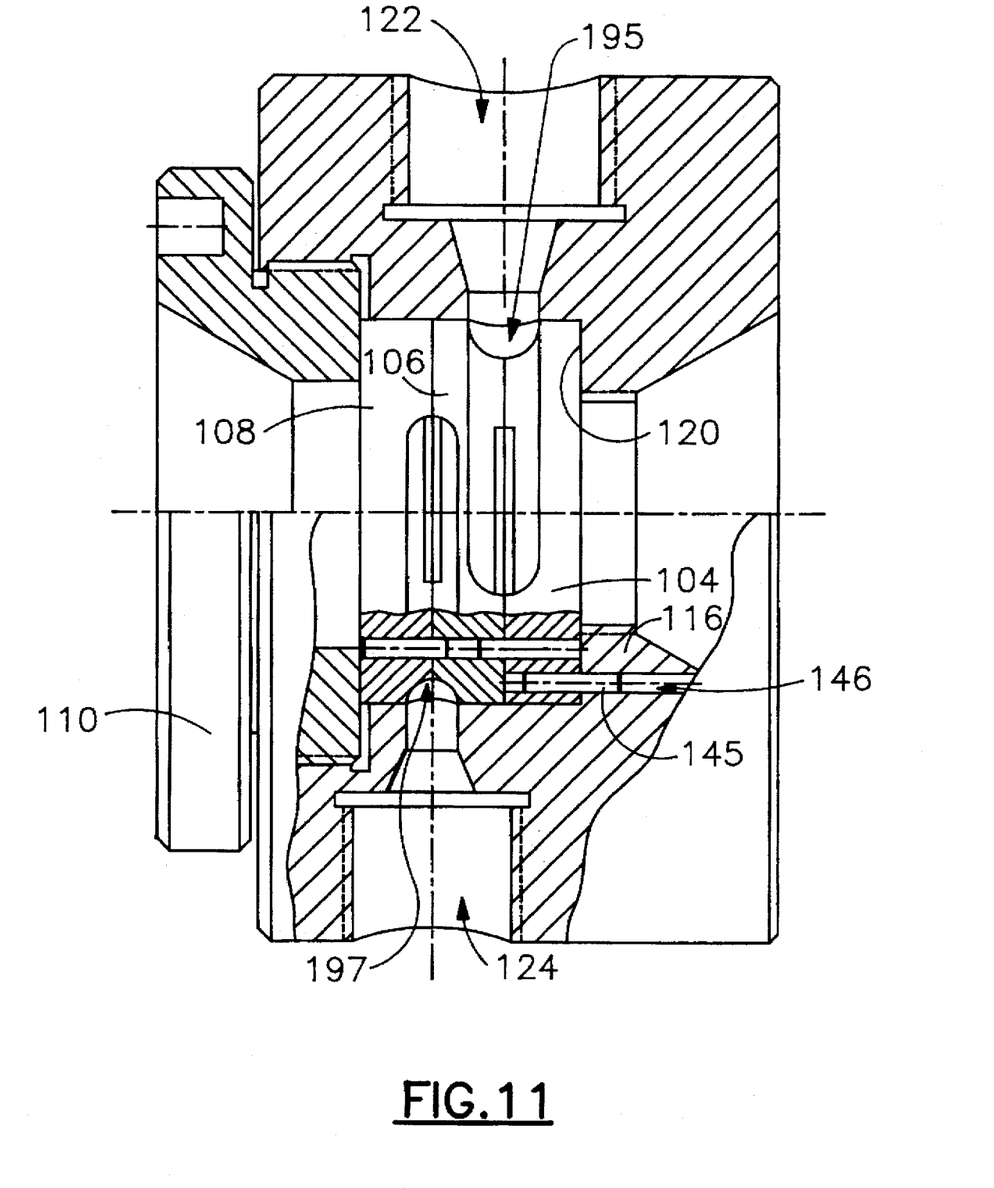
FIG. 11 is a side elevational view of the die of FIG. 10, showing the elements in assembled relation, the upper half and a fragment of the lower half being shown in section through the vertical centerline.

Turning now to FIGS. 10–21, there is illustrated crosshead die apparatus, denoted generally by reference numeral 100, wherein the principles of the invention are employed in applying two, superposed layers of coating material to a single wire. Apparatus 100 includes body portion 102, first tip member 104, second tip member 106, die member 108 and cover portion 110. As in the first embodiment, an axial bore extending through body 102 has a forward, threaded portion 112, intermediate, smooth portion 114 and rear, threaded portion 116. Portions 112 and 114 are separated by a shoulder or surface 118, and portions 114 and 116 are separated by surface 120. Radial bores 122 and 124 extend through body 102 to communicate at their inner ends with axial bore portion 114 at axially spaced positions, as best seen in FIG. 11.

First and second tip members 104 and 106, and die member 108 are of essentially the same wafer-like configuration as previously described tip and die members 14 and 16. In the assembled condition, as seen in FIG. 11, members 104, 106 and 108 have equal diameters approximately equal to the diameter of axial bore portion 114 and a combined axial thickness approximately equal to the axial length of bore portion 114. Members 104, 106 and 108 are positioned within axial bore portion 114 and are maintained in a desired rotational orientation relative to one another by pins 126 and 128 extending from forward surface portions 130 and 132, respectively, of first tip member 104 into the rearwardly facing ends of through openings 134 and 136, respectively, in second tip member 106, and by pins 138 and 140 extending from rear surface portions 142 and 144, respectively (FIGS. 18–20) of die member 108 into the forward ends of openings 134 and 136. Members 104, 106 and 108 are maintained in a desired rotational orientation with respect to axial bore portion 114 by pin 145 extending through axial opening 146 (FIG. 11) in body 102 into opening 148 in first tip member 104.

Figure 12:
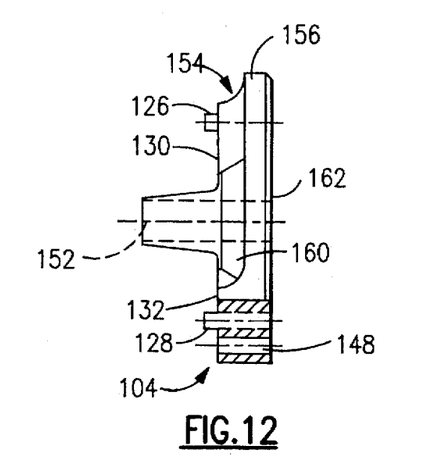
FIG. 12 is a side elevational view of one of the elements of FIGS. 10 and 11.
Figure 13:
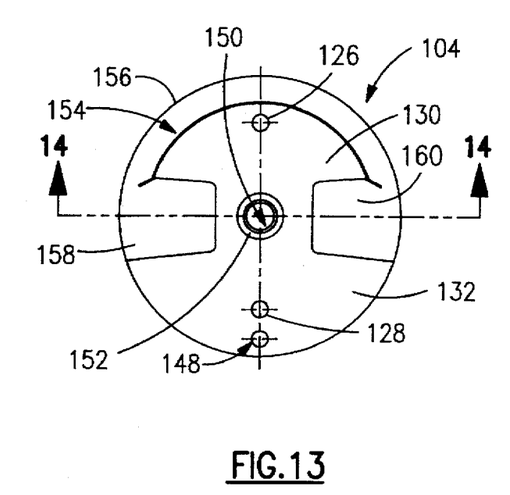
FIG. 13 is a rear elevational view of the element of FIG. 12.
Figure 14:
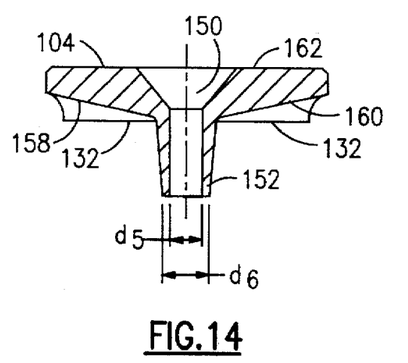
FIG. 14 is a side elevational view in section on the line 14—14 of FIG. 13.
Figure 15:
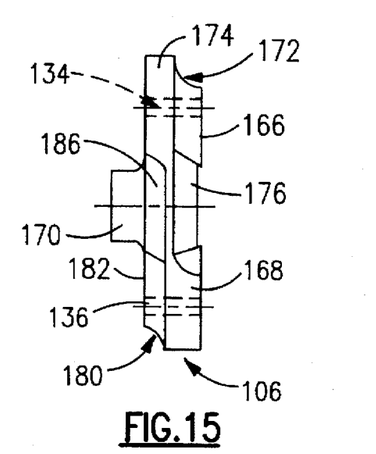
FIG. 15 is a side elevational view of another of the elements of FIGS. 10 and 11.
Figure 16:
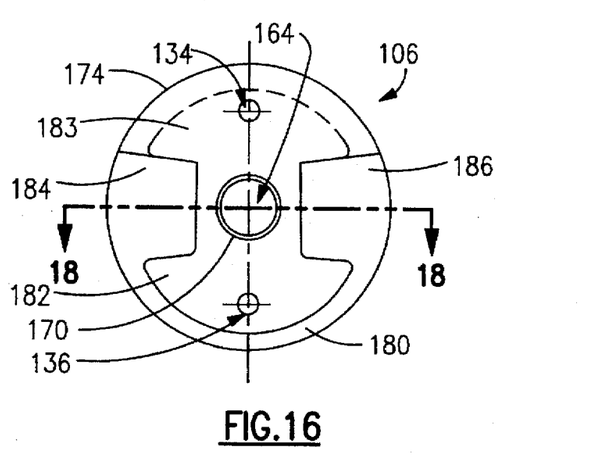
FIGS. 16 and 17 are front and rear elevational views, respectively, of the element of FIG. 15.
Figure 17:
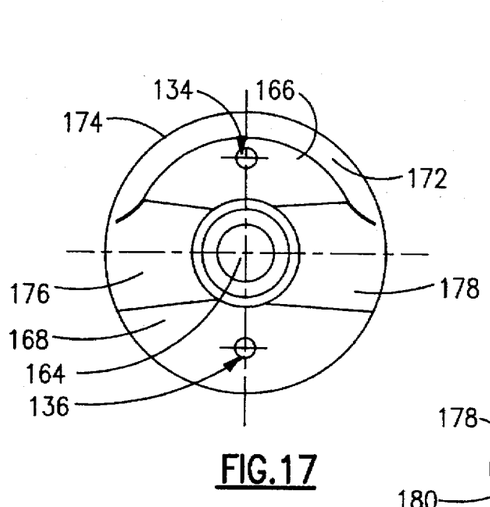
Figure 18:
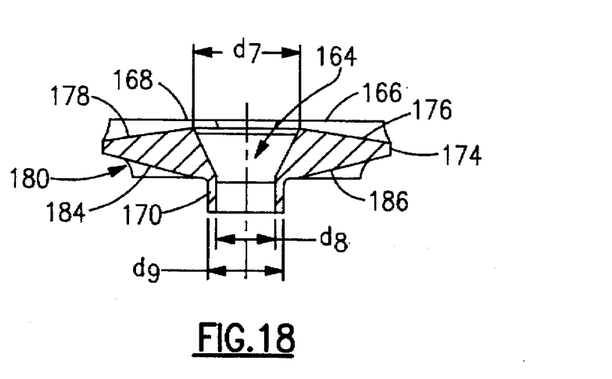
FIG. 18 is a side elevational view in section on the line 18—18 of FIG. 16.

First tip member 104 is shown individually in FIGS. 12–14, wherein the aforementioned features may be more clearly seen. In addition, it will be seen that first tip member 104 has a central opening 150 the forward portion of which is surrounded by tip or protrusion 152. Opening 150 has a diameter $d_5$ at its forward end and protrusion 152 has an outside diameter $d_6$ (FIG. 14). A portion of the periphery of first tip member 104 is cut away to form groove 154 of arcuate cross section extending from forward surface portion—to cylindrical surface portion 156. Groove 154 extends from a mid-point adjacent pin 126 in both directions about the periphery of first tip member 104 to meet surface portions 158 and 160 on opposite sides of opening 150. As best seen in FIG. 14, surface portions 158 and 160 taper in a direction toward the forward side from the outer periphery of first tip member 104 to merge with the base of protrusion 152. First tip member 104 has a flat, rear surface 162 portions of which adjacent the periphery contact surface 118 of body 102 in the assembled condition of the elements.

Second tip member 106 is shown individually in FIGS. 15–18. Central opening 164 has a diameter $d_7$ at rear surface portions 166 and 168 and tapers inwardly to merge with a second to constant diameter $d_8$, surrounded by protrusion 170 having an outside diameter $d_9$. Groove 172 extends in an arcuate surface from rear surface portion 166 to cylindrical peripheral surface 174, in both directions from a mid-point adjacent opening 134 to merge with surface portions 176 and 178 on opposite sides of opening 164. Groove 180 extends in an arcuate surface from forward surface portion 182 to peripheral surface 174 in both directions from a mid-point adjacent opening 136 to merge with surface portions 184 and 186 on opposite sides of opening 164. Surface portions 176 and 178 taper forwardly and surface portions 184 and 186 rearwardly from the periphery of second tip member 106 toward opening 164.

Figures 19, 20:
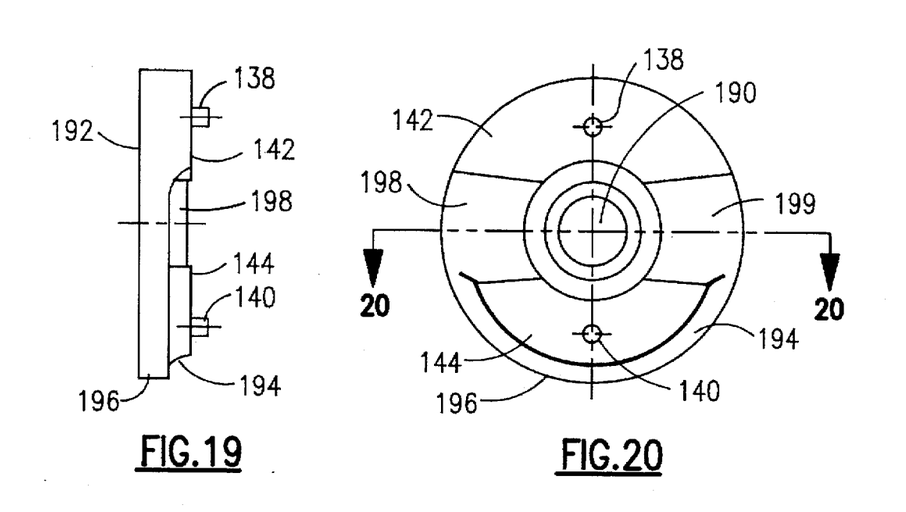
FIG. 19 is a side elevational view of another of the elements of FIGS. 10 and 11.
FIG. 20 is a front elevational view of the element of FIG. 19.
Figure 21:
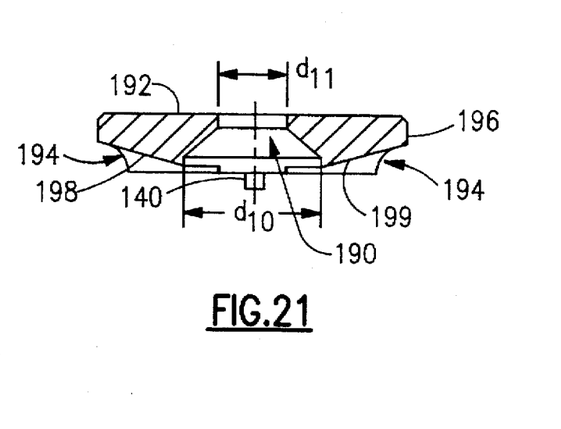
FIG. 21 is a side elevational view in section on the line 21—21 of FIG. 20.

Die member 108 is shown individually in FIGS. 19–21. Central opening 190 has a diameter $d_{10}$ at rear surface portions 142 and 144, and a diameter $d_{11}$ at front surface 192. Groove 194 extends in an arcuate surface from rear surface portion 144 to cylindrical peripheral surface 196, from a mid-point adjacent opening 140 in both directions about the periphery of die member 108 to merge with surface portions 198 and 199 which taper in a direction toward the rear from the outer periphery of the die member to opening 190. As in central opening 70 of die member 16, opening 190 has sections of constant diameter immediately adjacent both the front and rear surface portions which merge with a central conical or tapered portion at opposite ends of the latter.

Figure 22:
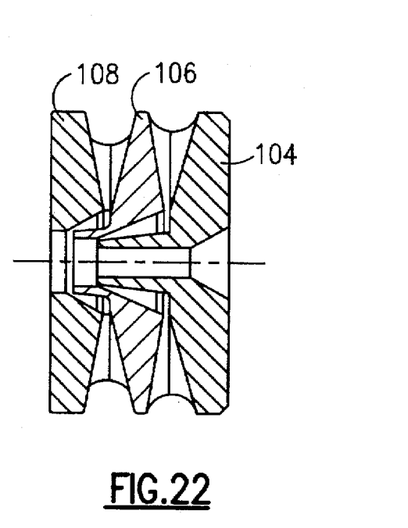
FIG. 22 is a sectional, side elevational view showing in assembled relation the three elements as seen in FIGS. 14, 18 and 21.

Members 104, 106 and 108 are shown in assembled condition in FIG. 22, and in assembled condition with body 102 in FIG. 11. Forward surface portions 130 and 132 of first tip member 104 are in opposed, contacting relation with rear surface portions 166 and 168 of second tip member 106, and forward surface portions 182 and 183 of second tip member 106 are in contact with rear surface portions 142 and 144 of die member 108. Portions of die member front surface 192 and first tip member rear surface 162 adjacent the peripheries thereof are engaged by cover portion 110 and surface 118, respectively, to retain members 104, 106 and 108 axially fixed within body portion 102. Rotational orientation, as previously explained, is maintained by pins 126, 128, 138, 140 and 145 extending into openings 134, 136 and 148.

When so positioned, grooves 154 and 172 in first and second tip members 104 and 106, respectively, are directly adjacent one another and combine to form a unitary groove of semi-circular cross section, as seen and indicated by reference numeral 195 in FIG. 11. Likewise, groove 180 of second tip member 106 is immediately adjacent groove 196 of die member 108, and the two grooves combine to form the unitary groove 197 also seen in FIG. 11. Groove 195 and the adjacent portion of axial bore section 114 combine to form a first, enclosed passageway extending in both directions from the inner end of radial bore 122 to communicate at one end with the space between tapered surfaces 160 and 176 and at the other end with the space between tapered surfaces 158 and 178 of first and second tip members 104 and 106. Groove 197 and the adjacent portion of axial bore section 114 combine to form a second, enclosed passageway extending in both directions from the inner end of radial bore 124 to communicate at one end with the space between tapered surfaces 184 and 199 and at the other end with the space between tapered surfaces 186 and 198 of second tip member 106 and die member 108, respectively.

As best seen in FIG. 22, when members 104, 106 and 108 are in assembled relation, protrusion 152 of first tip member 104 extends through both opening 164 of second tip member 106 and opening 190 od die member 108. The difference in diameters provides an annular space between the outside of the terminal end of protrusion 152 and the inner surface of protrusion 170. Thus, coating material $C_1$ entering through radial opening 122 (or the conduit connected thereto) flows in both directions about groove 195 through the first, enclosed passageway, into the spaces between the opposed, tapered surfaces on the front side of first tip member 104 and the rear side of second tip member 106, and through the annular space between the outer and inner surfaces of protrusions 152 and 170, respectively, to be deposited uniformly on the surface of wire $W_1$ as the latter moves axially through die apparatus 100. Wire $W_1$ has a diameter closely approximating diameter $d_5$ and is thus guided coaxially of members 104, 106 and 108 by first tip member 104.

Protrusion 170 extends forwardly through opening 190 in die member 108 with the difference in diameters providing an annular space between the protrusion outer surface and the adjacent surface of the opening. Thus, coating material $C_2$ entering through radial opening 124 (or the conduit connected thereto) flows in both directions about groove 197 through the second, enclosed passageway, into the spaces between the opposed, tapered surfaces on the forward side of second tip member 106 and the rear side of die member 108, and through the annular space between the outer surface of protrusion 170 and the surrounding surface of opening 190 to be deposited in a uniform layer on coating material $C_1$.

It is thus apparent that the die apparatus construction of FIGS. 10–22 is adapted to apply two, concentric, superposed layers of coating materials to a wire moved axially through the apparatus. The thickness of each layer is determined by the radial dimensions of the annular spaces through which the first and second coating materials flow to be deposited upon the wire and the first coating layer, respectively. Such operating parameters as temperatures and pressures of the coating materials, speed of movement of the wire through the apparatus, etc. may be determined in conventional manner by those familiar with cross-head die coating operations.

Figure 23:
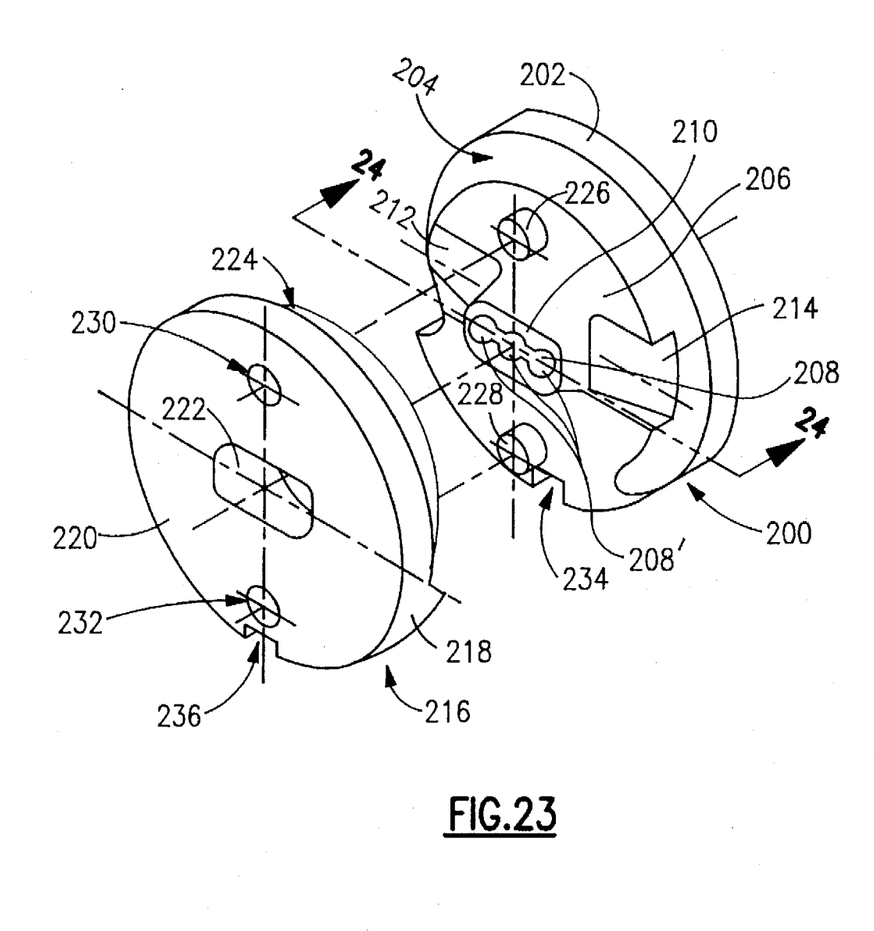
FIG. 23 is a perspective view of a pair of elements embodying another embodiment of the invention.
Figure 24:
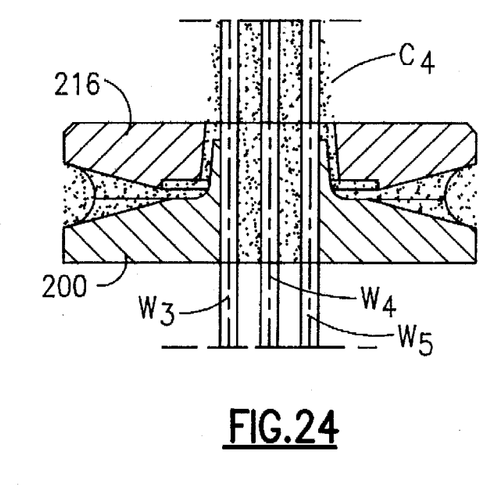
FIG. 24 is a top plan view of the elements of FIG. 23, shown in an operative position and in section on the line 24—24 of FIG. 23.

From the foregoing description, it is apparent how the principles of the invention may be employed to apply both single and multiple coating layers to a single strand of wire. An embodiment shown in FIGS. 23 and 24 illustrate use of these principles in applying a coating material in a unitary manner to a plurality of spaced, parallel wires. Such an application of principles of the invention is useful, for example, in the fabrication of so-called flat ribbon cables. From the previously described embodiments, it may be seen how multiple coating layers could be applied to a plurality of parallel wires.

An embodiment of tip and die members incorporating principles of the invention to produce a multi-strand cable, i.e., a plurality of wires in spaced, parallel relation with a unitary, single layer of coating material, is shown in FIGS. 23 and 24. Tip member 200 is of the same relatively flat, wafer-like configuration as previously described tip members 14, 104 and 106, having cylindrical peripheral surface 202 with an axial length which is small relative to its diameter. As in the previous embodiments, tip member 200 includes peripheral groove 204 in the form of an arcuate surface extending between forward surface portion 206 and peripheral surface 202, centrally disposed, laterally elongated opening 208 surrounded over a portion of its length by forwardly extending protrusion 210, and surface portions 212 and 214 tapering forwardly from the periphery toward the center of tip member 200.

Die member 216 likewise has a construction and configuration analagous to that of die members 16 and 108, including cylindrical peripheral surface 218, flat forward surface 220 and central opening 222. Although not fully seen, it will be understood that die member 216 includes rearwardly facing peripheral groove 224, as well as a plurality of rear surface portions some of which are perpendicularly disposed and others of which are angularly disposed (tapered) with respect to the axis of opening 222, as in the previous embodiments. Also, tip and die members 200 and 216 are maintained in a desired rotational orientation relative to one another by pins 226 and 228 on tip member 200 extending into openings 230 and 232, respectively, and relative to the axial bore of a body portion of the apparatus by a locator pin extending into aligned notches 234 and 236 in the peripheries of the tip and die members, respectively.

It will be noted that essentially the only difference between tip and die members 14 and 16 and tip and die members 200 and 216, respectively, is the shape of the central openings and the protrusion on the tip member. That is, the openings and protrusion of the previously described embodiment are of circular cross section since a coating of circular cross section to a wire of circular cross section, whereas protrusion 210 and opening 222 of tip and die members 200 and 216, respectively, are of substantially oval configuration. Opening 208 of tip member 200 has a plurality of circular portions 208' which are mutually joined to form a unitary opening of generally oval configuration.

In operation, tip and die members 200 and 216 are placed with respective forward and rear surface portions in mutual contact in the relative rotational orientation provided by pins 226, 228 and openings 230, 232. Protrusion 210 extends into opening 222 with the difference in dimensions providing an oval-shaped, annular space surrounding wires $W_3$, $W_4$ and $W_5$ as the latter move axially at equal speed through circular portions 208' of opening 208. Tip and die members 200 and 216 are, of course, positioned within a section of the through axial bore of the body of die apparatus as in the previously described embodiment. The body has the same radial bore for flow of coating material into the axial bore and the tip and die members are cooperatively positioned to provide flow passages to the annular space between protrusion 210 and opening 222 in the same manner as previously described. That is, peripheral grooves 204 and 224 combine to form a unitary groove which cooperates with adjacent portions of the body axial bore to provide an enclosed passageway communicating at opposite ends with the spaces between the opposed, spaced surfaces of the tip and die members which taper toward one another from the peripheries toward the center, and thence with the annular space through which coating material $C_4$ is deposited upon wires $W_3$, $W_4$ and $W_5$.

The outer, cross-sectional configuration of coating material $C_4$ is, of course, determined by the configuration of opening 222. Although this configuration will in any event be oblong, having a width greater than its height, it need not be of the oval shape shown in FIGS. 23 and 24. The coating material will normally surround each of the laterally spaced wires and may include longitudinal grooves in its outer surface between each pair of adjacent wires, as is conventional with many flat ribbon cables having a plurality of mutually insulated conductors. From the foregoing description, it will be readily understood that the tip and die members may be designed to accommodate essentially any desired number and size of wires and to which single or multiple layers of coating materials may be applied.

What is claimed is:

1. Cross-head die apparatus for applying a continuous coating of flowable material to an elongated, filamentary member as the latter moves axially through said apparatus from rear to forward sides thereof, said apparatus comprising, in combination:

a) a body having an axial bore extending therethrough and at least one inlet bore through which said flowable material may flow into said axial bore in a radial direction at a predetermined position;

b) at least one tip member having forward and rear surfaces, a first, through opening having a cross sectional configuration closely approximating the cross sectional shape and size of said filamentary member, and a protrusion extending from said forward side, said protrusion having an outer surface and surrounding said first opening over at least a portion of its length;

c) at least one die member having forward and rear surfaces, a second, through opening having a cross sectional configuration larger than said outer surface of said protrusion;

d) means for retaining said tip and die members within said axial bore in predetermined, fixed orientations with respect to one another and to said axial bore with portions of said tip member forward surface contacting portions of said die member rear surface and said protrusion extending at least partially through said second opening to define an annular space between said protrusion outer surface and the surface of said second opening; and e) flow passage means through which said inlet bore communicates with said annular space, whereby flowable material entering said axial bore flows through said passage means and said annular space to be deposited on a filamentary member moving axially through said second opening.

2. The apparatus of claim 1 wherein each of said tip and die members include peripheral surface portions substantially contacting contiguous surface portions of said axial bore.

3. The apparatus of claim 2 wherein said flow passage means is at least partially defined by surface portions of both of said tip and die members.

4. The apparatus of claim 3 wherein said flow passage means is further defined by surface portions of said axial bore.

5. The apparatus of claim 1 wherein each of said tip and die members includes a peripheral groove communicating with said inlet bore and forming portions of said flow passage means.

6. The apparatus of claim 5 wherein said tip and die members includes respective forward and rear surface portions in opposed, spaced relation forming portions of said flow passage means through which said peripheral grooves communicate with said annular space.

7. The apparatus of claim 6 wherein said peripheral grooves are immediately adjacent one another and combine to form a unitary groove.

8. The apparatus of claim 7 wherein said unitary groove is of substantially semi-circular cross section.

9. The apparatus of claim 8 wherein said unitary groove and adjacent surface portions of said axial bore cooperatively define an enclosed passageway through which said inlet bore communicates with the space between said opposed, spaced surface portions.

10. The apparatus of claim 9 wherein said opposed, spaced surface portions taper toward one another from the peripheries of said tip and die members toward said first and second openings.

11. Cross-head die apparatus for applying a coating of flowable material to an elongated, filamentary member, said apparatus comprising, in combination:
   a) a body having a cylindrical, axial bore extending therethrough and at least one inlet bore extending through a wall of said body to communicate with said axial bore at a predetermined position;
   b) a tip member having a first, cylindrical, peripheral surface, front and rear surface portions in spaced, parallel, first and second planes, and a through, first opening having an axis centrally coaxial with said first surface and perpendicular to said first and second planes;
   c) a die member having a second, cylindrical, peripheral surface, front and rear surface portions in spaced, parallel, third and fourth planes, and a through, second opening having an axis centrally coaxial with said second surface and perpendicular to said third and fourth planes;
   d) means for retaining said tip and die members within a cylindrical portion of said axial bore having a diameter substantially equal to the diameters of both said first and second cylindrical surfaces; and
   e) flow guide means through which said inlet bore communicates with said second opening.

12. The apparatus of claim 11 wherein said tip and die members are retained within said axial bore portion with said first and fourth planes substantially coplanar.

13. The apparatus of claim 12 wherein said tip member includes a protrusion surrounding said first opening over at least a portion of the axial length of said first opening, said protrusion extending from said second plane into and surrounded by said second opening to provide an annular space through which said flowable material passes to be applied to said filamentary member as the latter is moved axially through said first opening.

14. The apparatus of claim 13 wherein said flow guide means includes an enclosed passageway extending from direct communication with said inlet bore at said predetermined position at least partially to said annular space.

15. The apparatus of claim 14 wherein said passageway extends in two directions from said predetermined position.

16. The apparatus of claim 15 wherein said passageway has a cross section defined by portions of each of said tip and die members and said axial bore.

17. The apparatus of claim 11 wherein each of said first and second openings is of circular cross section.

18. The apparatus of claim 11 wherein each of said first and second openings is of oblong cross section.

19. The apparatus of claim 11 and further including means for maintaining said tip and die members in a predetermined rotational orientation relative to one another.

20. The apparatus of claim 19 wherein said flow passage means includes a peripheral groove extending at least partially around at least one of said first and second peripheral surfaces of said tip and die members, respectively.

21. The apparatus of claim 20 wherein said tip and die members are retained within said axial bore portion with said first and fourth planes substantially coplanar, said tip member includes a first, peripheral groove extending between said peripheral and front surface portions thereof, and said die member includes a second, peripheral groove extending between said peripheral and rear surface portions thereof.

22. The apparatus of claim 21 wherein said first and second peripheral grooves are immediately adjacent one another when said tip and die members are in said predetermined rotational orientation relative to one another, thereby combining to form a unitary groove.

23. The apparatus of claim 22 and further including means for maintaining said tip and die members in a predetermined rotational orientation relative to said axial bore.

24. The apparatus of claim 23 wherein said unitary groove extends between opposite ends and has a mid-point substantially at said predetermined position when said tip and die members are in said predetermined rotational orientation relative to said axial bore.

25. Cross head die apparatus for applying a layer of coating material to one or more elongated, filamentary members as the latter are moved through said apparatus in an axial direction, said apparatus comprising:
   a) a body portion having a through axial bore and an inlet bore extending through a wall of said body and communicating with said axial bore at a predetermined position;
   b) a die member of generally wafer-like configuration having a cylindrical peripheral surface, front and rear surface portions in first and second, respective, parallel planes spaced by a distance not more than about ¼ of the diameter of said cylindrical surface, and a first, through opening having a central axis perpendicular to said first and second planes;
   c) a tip member of generally wafer-like configuration having a cylindrical peripheral surface, front and rear surface portions in third and fourth, respective, parallel planes spaced by a distance not more than about ¼ of the diameter of said cylindrical surface, an integral protrusion extending forwardly from said third plane, and a second, through opening having a central axis perpendicular to said third and fourth planes and extending through said protrusion;

d) means for maintaining said tip and die members within a portion of said axial bore which includes said predetermined position with at least portions of said tip member front surface and said die member rear surface in mutual contact, said first and second openings coaxial and said protrusion extending into said first opening, the difference in cross-sectional dimensions of said protrusion and said first opening providing an annular space surrounding said protrusion; and e) flow guide means through which said inlet bore communicates with said annular space.

26. The apparatus of claim 25 wherein said maintaining means comprises a cover member having a threaded portion for selective engagement with a threaded forward section of said axial bore.

27. The apparatus of claim 26 and further including a tip and die removal element having a threaded portion for selective engagement and forward advance within a threaded, rear section of said axial bore to push said tip and die members forwardly, out of said first axial bore section when said cover member is removed.

28. The apparatus of claim 25 wherein said flow guide means comprises an enclosed passageway extending in opposite directions from said predetermined position for at least a portion of the distance around said first axial bore section.

29. The apparatus of claim 25 wherein said flow guide means includes spaced, opposed surface portions on the forwardly and rearwardly facing sides, respectfully, of said tip and die members.

30. The apparatus of claim 29 wherein said opposed surface portions extend from the peripheries toward the center of said tip and die members.

31. The apparatus of claim 30 wherein said opposed surfaces are angularly disposed toward one another from said peripheries toward said centers of said tip and die members, whereby said opposed surfaces are closer to one another in the area toward said centers than in the area toward said peripheries.

* * * * *